United States Patent [19]

Galvez et al.

[11] Patent Number: 5,552,481
[45] Date of Patent: Sep. 3, 1996

[54] VINYL CHLORIDE POLYMER/POLYOLEFIN POLYBLENDS HAVING IMPROVED RHEOLOGICAL PROPERTIES

[75] Inventors: Jean-Marc Galvez, Brussels, Belgium; Philippe Renouard, Brionne, France

[73] Assignee: Elf Atochem S.A., Puteaux, France

[21] Appl. No.: 283,915

[22] Filed: Aug. 3, 1994

Related U.S. Application Data

[63] Continuation of Ser. No. 884,202, May 18, 1992, abandoned.

[30] Foreign Application Priority Data

May 16, 1991 [FR] France ................... 91 05954

[51] Int. Cl.⁶ ............... C08L 23/00; C08L 27/06; C08L 51/06
[52] U.S. Cl. ............... 525/74; 525/80; 525/317
[58] Field of Search ................ 525/74, 70, 80, 525/317

[56] References Cited

U.S. PATENT DOCUMENTS

| | | | |
|---|---|---|---|
| 4,605,704 | 8/1986 | Eastman et al. | 525/70 |
| 4,748,210 | 5/1988 | Okawa et al. | 525/74 |
| 4,957,974 | 9/1990 | Illenda et al. | 525/70 |

FOREIGN PATENT DOCUMENTS

| | | |
|---|---|---|
| 0317680 | 11/1987 | European Pat. Off. . |
| 317680A | 5/1989 | European Pat. Off. . |

*Primary Examiner*—Paul R. Michl
*Assistant Examiner*—Mark L. Warzel
*Attorney, Agent, or Firm*—Burns, Doane, Swecker & Mathis, L.L.P.

[57] ABSTRACT

Polyblend molding compositions, well adopted for the production of flame-resistant and adhesively integral composite shaped articles, are formulated from particulates of (a) at least one vinyl chloride polymer, (b) at least one polyolefin, and (c) at least one α-monoolefin terpolymer having a vinyl chloride polymer grafted to the backbone thereof.

15 Claims, 2 Drawing Sheets

VINYL CHLORIDE POLYMER/POLYOLEFIN POLYBLENDS HAVING IMPROVED RHEOLOGICAL PROPERTIES

This application is a continuation, of application Ser. No. 07/884,202, filed May 18, 1992, now abandoned.

BACKGROUND OF THE INVENTION

1. Field of the Invention

The present invention relates to polyblend compositions comprising a vinyl chloride polymer (PVC) and a polyolefin and to the use of such polyblends for applications which require rheological properties and fire resistance which are compatible with the production of molded shaped articles and objects, for example cases, covers and frames employed in the field of office equipment.

2. Description of the Prior Art

The conventional techniques for converting polyblend compositions include, for example, extrusion, blow extrusion, calendaring, thermoforming, injection molding and others. These techniques require a composition having sufficient fluidity when heated.

Polymeric resins which have high-performance mechanical properties and which intrinsically have a high fire resistance are known to this art for the production of such molded shaped articles and objects.

PVC is acknowledged to be an excellent material in this respect. However, this polymer presents a certain number of disadvantages, especially a poor injectability when its fluidity values K range from 54 to 70.

Injection presses fitted with screws which have highly specific profiles must be employed, and these are of a type likely to retard the development of the aforesaid shaped articles which are molded on standard presses.

To remedy this disadvantage, mixtures of PVC with various thermoplastic polymers have heretofore been formulated, especially with polyolefins serving to lower the melt viscosity of the PVC and, consequently, making it easier to convert the mixtures thus formulated, especially by injection molding.

Although the mixtures obtained have a suitable melt viscosity for the application of the above indicated conversion techniques, the compatibility of their constituents is reduced. The adhesion between the disperse phase and the matrix is poor and during conversion of these mixtures a marked decrease in the mechanical properties and a delamination are observed, effectively precluding their use for a wide variety of intended applications.

SUMMARY OF THE INVENTION

Figure 1:
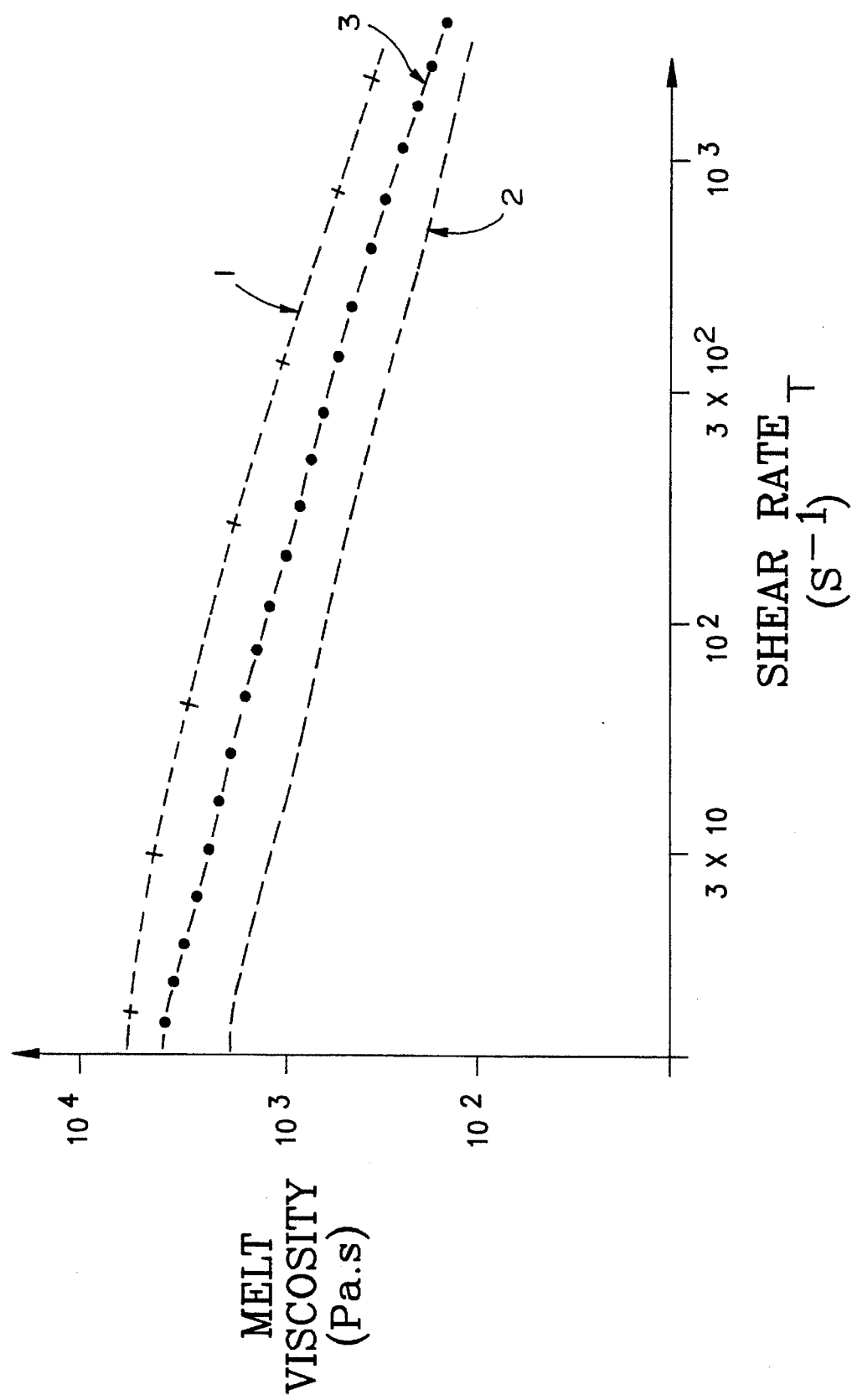
FIG. 1 shows capillary viscometer rheological curves for PVC (curve 1) and the mixtures of Example 1 (curve 2) and Example 2 (curve 3).

Accordingly, a major object of the present invention is the provision of novel PVC/polyolefin polyblends having an improved melt viscosity and which exhibit an excellent adhesion between the matrix and the disperse phase, comprising at least one vinyl chloride polymer, at least one polyolefin and at least one α-monoolefin terpolymer grafted with vinyl chloride.

DETAILED DESCRIPTION OF THE PREFERRED EMBODIMENTS OF THE INVENTION

More particularly according to the present invention, the subject polyblend compositions advantageously comprise:

(a) from 1 to 100 parts by weight of a vinyl chloride polymer;

(b) from 1 to 100 parts by weight of a polyolefin; and (c) from 1 to 30 parts by weight of an α-monoolefin terpolymer backbone onto which are grafted vinyl chloride sequences.

Such α-monoolefin terpolymer grafted with vinyl chloride, described in published European Patent Application No. 317,680, advantageously comprises a backbone terpolymer constituted by:

(i) 51% to 96% by weight of ethylene;

(ii) 3% to 40% by weight of an alkyl acrylate or methacrylate, the alkyl moiety having from 1 to 8 carbon atoms; and (iii) 1% to 9% by weight of an unsaturated dicarboxylic acid anhydride.

The grafts consist essentially of a vinyl chloride homo- or copolymer, the amount of comonomer polymerizable with the vinyl chloride not being in excess of 25% by weight. Vinyl acetate, ethylene and propylene are exemplary such comonomers polymerizable with vinyl chloride.

The proportion of the backbone terpolymer in the grafted terpolymer is not less than 2% and not more than 98% by weight and preferably ranges from 60% to 95%.

The preferred alkyl acrylates or methacrylates are ethyl acrylate an ethyl methacrylate.

The preferred unsaturated dicarboxylic acid anhydrides are maleic anhydride, itaconic anhydride and citraconic anhydride, and very particularly maleic anhydride.

By "vinyl chloride polymer" (PVC) is intended any vinyl chloride homo- or copolymer prepared by polymerization in bulk, in suspension, in emulsion, in microsuspension, or in suspended emulsion, the difference between the final products essentially residing in the ultimate particle size; the mean diameter of the particles may range from 130 µm in the case of PVC prepared by bulk polymerization to 20 µm in the case of a PVC prepared by emulsion or microsuspension polymerization.

Vinyl acetate, vinylidene chloride, acrylonitrile, chlorotrifluoroethylene and/or the esters of acrylic, fumaric, maleic and/or itaconic acids are exemplary monomers which are copolymerizable with vinyl chloride.

In addition, the polyvinyl chloride can be chlorinated up to a chlorine content of not more than 70% by weight.

Among these PVCs, particularly preferred are the vinyl chloride homopolymers prepared by bulk or suspension polymerization and exhibiting a K value not exceeding 70 and preferably ranging from 54 to 65.

By "polyolefin" is intended any homopolymer or copolymer of a monolefin having the formula $CH_2=CH-W$ in which W is a hydrogen atom or an optionally substituted hydrocarbon radical having from 1 to 12 carbon atoms.

Ethylene, propylene, 1-butene and 4-methyl-1-pentene homo- and copolymers are very particularly exemplary such polyolefins.

Among the aforesaid polyolefins, particularly preferred are the ethylene homopolymers, propylene homopolymers and the copolymers of ethylene and propylene which have a molar proportion of ethylene ranging from 0.5% to 30% by weight and preferably from 0.5% to 5%.

The invention very particularly features the propylene homopolymer which has a melt index (MI) of at least 5 g/10 min and preferably ranging from 15 to 40 g/10 min, measured at 230° C. under 2.16 kg.

The three constituents, namely, the PVC, the polyolefin and the α-monoolefin terpolymer grafted with vinyl chloride, may optionally include small amounts of other compounds of the stabilizer, antistatic agent, lubricant or plasticizer type, as well as other polymeric materials.

Since the constituents are in the form of a powder or granules, the formulation of the composition is carried out, for example, by dry blending the polymer granules and/or powders with the α-monolefin terpolymer grafted with vinyl chloride.

The blending is advantageously carried out at room temperature for a period of time up to 1 hour.

This dry blending is advantageously followed by compounding to provide a good dispersion of the constituents at a temperature which generally ranges from 170° C. to 200° C.

The mixture is then injection-molded at a temperature which is generally on the order of 170° to 200° C.

The compositions according to the invention present the advantage of having a better processability, especially in the case of injection molding. The reduction in the injection cycles and the low shrinkage of the molded articles make it possible to improve production efficiency.

The compositions of the invention also exhibit an excellent fire and flame resistance.

In order to further illustrate the present invention and the advantages thereof, the following specific examples are given, it being understood that same are intended only as illustrative and in nowise limitative.

EXAMPLES 1 TO 4:

(A) Four mixtures were produced using a Werner type ZSK 30 extruder at an average temperature of 200° C. in the case of Examples 1 and 2 and of 185° C. in the case of Examples 3 and 4 with the following constituents, in the proportions which are reported in Table 1:

PVC - vinyl chloride homopolymer prepared by bulk polymerization, having a K value of 57 and a mean particle size of approximately 130 μm, Examples 1, 2 and 4;

- vinyl chloride homopolymer having a K value of 50 in the case of Example 3;

PP - propylene homopolymer having a melt index (MI) of 40 g/10 min, measured at 230° C. under 2.16 kg.

α-Monoolefin terpolymer grafted with vinyl chloride (TPg)

- terpolymer of ethylene, ethyl acrylate and maleic anhydride (72/25/3% by weight) grafted with vinyl chloride (7% by weight of chlorine in the final product).

(B) In the case of each of the mixtures obtained, a cryogenic fracture was produced at a temperature at which nitrogen is liquid. The sample was metallized with gold (200 Å deposit) using an Edwards S150 SEM505 cathode sputterer and the following morphological parameters were measured:

(i) the adhesion between the disperse phase and the matrix, which was graded using a number from 0 to 3. Zero corresponds to a very poor adhesion, the fracture propagates at the nodule/matrix interface, the rupture is referred to as adhesive, the nodules are perfectly visible or can be extracted from the matrix at the time of the rupture; 3, the rupture is referred to as cohesive, the two phases cannot be distinguished.

(ii) the morphology (nodules/matrix).

In order to study the morphology of the mixture, the matrix was extracted with a suitable solvent and the nature of the disperse phase, which may be in the form of nodules, lamellae, fibers or in a cocontinuous form (the terms then used are nodular, lameliar, fibrillar or cocontinuous morphology) was observed with a scanning electron microscope (SEM). To measure the diameter of the particles of the disperse phase, the disperse phase was extracted and the surface of the sample was planed cold at approximately −60° C. with a glass knife and the sample was then observed in the SEM. The image obtained was analyzed using an image analyzer of the IBAS 2000 type, which provided access to the diameters of the nodules.

(C) In order to evaluate the fire behavior of the mixtures, the UL 94 fire reaction test according to NFT 51072 standard was carried out on molded tests specimens having a thickness of 3.2 mm.

The results are reported in Table 1.

(D) The melt viscosity of the PVC of K value 57 and of the mixtures from Examples 1 and 2 were measured at 200° C. using an Instron type 3211 capillary viscometer. The rheological curves are shown in FIG. 1.

Curve (1) relates to the PVC of K value 57,

Curve (2) relates to the mixture of Example 1 (90 parts by weight of PVC of K value 57 and 10 parts by weight of PP).

Curve (3) relates to the mixture of Example 2 in accordance with the invention (90 parts by weight of PVC of K value 57, 10 parts by weight of PP and 10 parts by weight of TPg). It will be seen that the introduction of 10 parts by weight of PP enabled the melt viscosity of the PVC to be lowered whatever the shear rate (curves 2 and 3).

The introduction of 10 parts of TPg into the PVC/PP mixture—mixture of Example 2 in accordance with the invention—made it possible to obtain, other than the lowering of viscosity, an excellent adhesion between phases (a score of 3), whereas in Example 1 the adhesion between the phase was nil.

TABLE 1

| EXAMPLE | COMPOSITION OF THE MIXTURE (parts by weight) | | | TEMPERATURE °C. | ADHESION BETWEEN PHASES | SEM observation of the mixture fracture) | FIRE TEST: UL 94 |
| | PVC | PP | TPg | | | | |
| --- | --- | --- | --- | --- | --- | --- | --- |
| 1 | 90 | 10 | | 200 | 0 | PP was distributed coarsely in the PVC matrix in the form | |

TABLE 1-continued

| EXAMPLE | COMPOSITION OF THE MIXTURE (parts by weight) | | | TEMPERATURE °C. | ADHESION BETWEEN PHASES | SEM observation of the mixture fracture) | FIRE TEST: UL 94 |
| --- | --- | --- | --- | --- | --- | --- | --- |
| | PVC | PP | TPg | | | | |
| 2 | 90 | 10 | 10 | 200 | 3 | of nodules PP was dispersed as a film in the PVC matrix in the form of filaments | VO |
| 3 | 90 | 10 | 10 | 185 | 3 | The diameter of the nodules was between 0.5 and 1 μm | VO |
| 4 | 90 | 10 | 10 | 185 | 3 | | VO |

EXAMPLES 5 TO 8:

Four mixtures were produced in a Haake vessel at an average temperature of 190° C. with a stirring speed equal to 60 rev/min for 6 min with the following constituents in the proportions indicated in Table 2:

PVC - vinyl chloride homopolymer prepared by bulk polymerization, having a K value of 57 and a mean particle size of approximately 130 μm;

PP - identical to that employed in Examples 1 to 4.

TPg - terpolymer identical to that employed in Examples 1 to 4.

The adhesion was measured on these four mixtures, using the technique described above.

The results are reported in Table 2:

TABLE 2

| EXAM-PLE | COMPOSITION OF THE MIXTURE (parts by weight) | | | TEMPER-ATURE (°C.) | ADHESION BETWEEN PHASES |
| --- | --- | --- | --- | --- | --- |
| | PVC | PP | TPg | | |
| 5 | 70 | 30 | | 190 | 0 |
| 6 | 70 | 30 | 10 | 190 | 3 |
| 7 | 50 | 50 | 10 | 190 | 3 |
| 8 | 10 | 90 | 20 | 190 | 3 |

EXAMPLE 9:

Under the same conditions as Examples 5 to 8, a mixture was produced containing 90 parts by weight of a PVC which was identical to that employed in the preceding Examples, 10 parts by weight of an ethylene homopolymer of MI=10 g/10 min and 10 parts by weight of TPg which was identical to that employed in the preceding Examples.

The adhesion of the sample, measured as described above, was 3.

The attached photomicrographs illustrate the various aspects of the invention and were obtained using a Philips SEM 505 scanning microscope.

Figure 2:
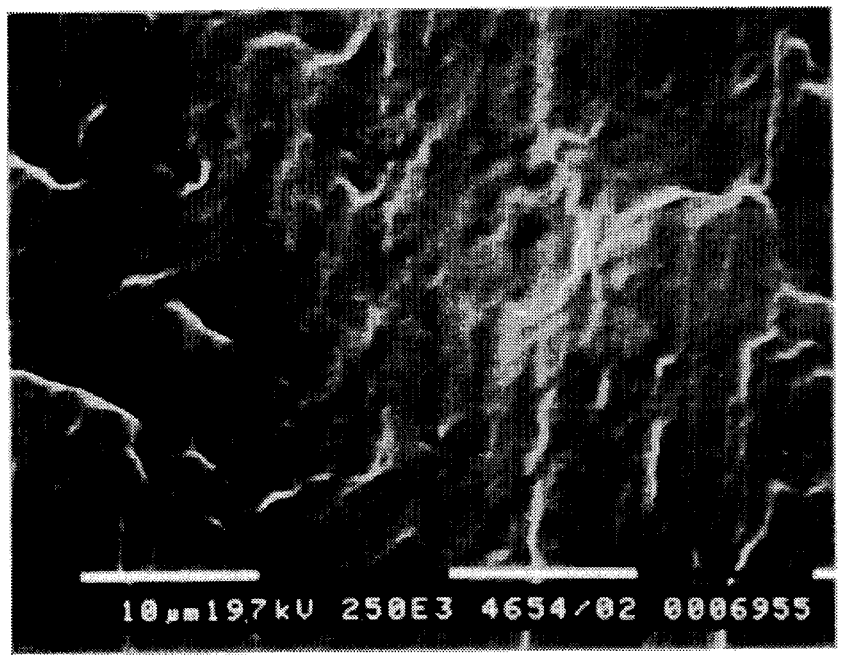
FIG. 2 illustrates a grain of the invention mixture.

FIG. 2 illustrates a grain of the mixture in accordance with the invention at a magnification of 2,500X.

Figure 3:
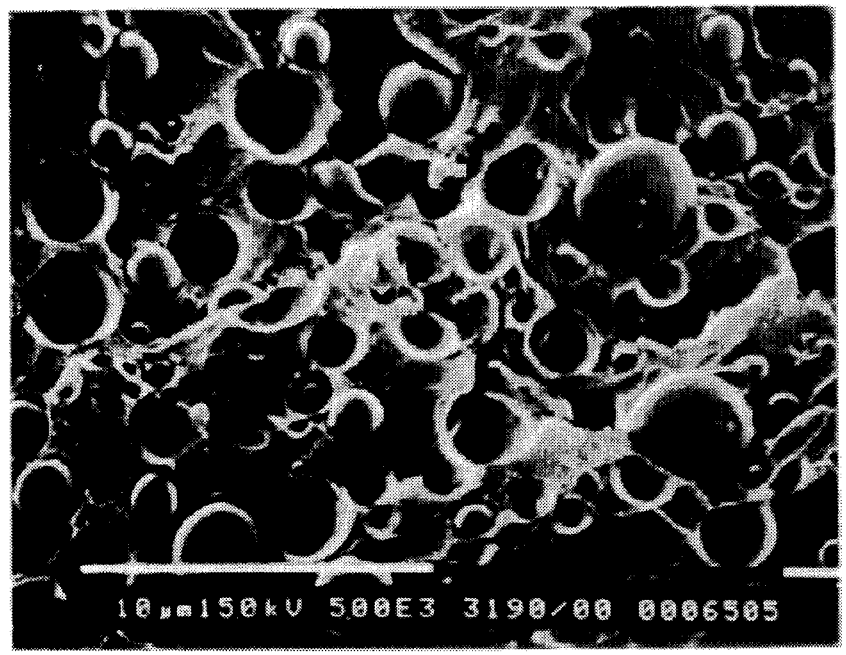
FIG. 3 illustrates a grain of PVC/PP mixture without any α-monoolefin terpolymer grafted with vinyl chloride.

FIG. 3 illustrates a grain of the PVC/PP mixture without any α-monoolefin terpolymer grafted with vinyl chloride, at a magnification of 5,000X.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyblend molding composition comprising (a) at least one vinyl chloride polymer, (b) at least one polyolefin, and (c) at least one α-monoolefin terpolymer having a vinyl chloride polymer grafted to the backbone thereof, the backbone of said graft terpolymer (c) comprising from 51% to 96% by weight of ethylene, from 3% to 40% by weight of an alkyl acrylate or methacrylate, the alkyl moiety of which having from 1 to 8 carbon atoms, and from 1% to 9% by weight of an unsaturated dicarboxylic acid anhydride.

2. The polyblend molding composition as defined by claim 1, the backbone of said graft terpolymer comprising from 2% to 98% by weight thereof of the graft terpolymer.

3. The polyblend molding composition as defined by claim 2, the backbone of said graft terpolymer comprising from 60% to 95% by weight of the graft terpolymer.

4. The polyblend molding composition as defined by claim 1, said vinyl chloride polymer grafted onto said at least one α-monoolefin terpolymer backbone comprising a vinyl chloride homo- or copolymer.

5. The polyblend molding composition as defined by claim 4, said vinyl chloride polymer grafted onto said at least one α-monoolefin terpolymer backbone comprising at least 75% by weight of polymerized vinyl chloride.

6. A polyblend molding composition comprising (a) at least one vinyl chloride polymer, (b) at least one polyolefin, and (c) at least one α-monoolefin terpolymer having a vinyl chloride polymer grafted to the backbone thereof, said at least one α-monoolefin terpolymer backbone comprising the copolymerizate of ethylene with ethyl acrylate and maleic anhydride.

7. The polyblend molding composition as defined by claim 1, said vinyl chloride polymer grafts comprising a copolymerizate of vinyl chloride with vinyl acetate, vinylidene chloride, acrylonitrile, chlorotrifluoroethylene, an ester of acrylic, fumaric, maleic and/or itaconic acid, or mixture thereof.

8. The polyblend molding composition as defined by claim 1, said vinyl chloride polymer grafts comprising a vinyl chloride homopolymer.

9. The polyblend molding composition as defined by claim 1, said at least one polyolefin (b) comprising a homopolymer or copolymer of a monoolefin having the formula $H_2C=CH-W$, wherein W is a hydrogen atom or a hydrocarbon radical having from 1 to 12 carbon atoms.

10. The polyblend molding composition as defined by claim 1, said at least one polyolefin (b) comprising a propylene homopolymer.

11. The polyblend molding composition as defined by claim 1, said at least one polyolefin (b) comprising an ethylene homopolymer.

12. A molded shaped article comprising the polyblend molding composition as defined by claim 1.

13. The polyblend molding composition as defined by claim 1, each of said constituents (a), (b) and (c) being in particulate state.

14. The polyblend molding composition as defined by claim 8, said vinyl chloride homopolymer having a K value ranging from 54 to 65.

15. A polyblend molding composition comprising; (a) from 1 to 100 parts by weight of at least one vinyl chloride polymer, (b) from 1 to 100 parts by weight of at least one polyolefin, and (c) from 1 to 30 parts by weight of at least one α-monoolefin terpolymer having a vinyl chloride polymer grafted to the backbone thereof, said terpolymer comprising from 51% to 96% by weight of ethylene, from 3% to 40% by weight of an alkyl acrylate or methacrylate, the alkyl moiety of which having from 1 to 8 carbon atoms, and from 1% to 9% by weight of an unsaturated dicarboxylic acid anhydride.

* * * * *